United States Patent Office 3,042,197
Patented July 3, 1962

3,042,197
HYDROGENATION PROCESS UTILIZING A PLATINUM - THIOCYANATE - ALUMINA CATALYST
Robert C. Binning, Xenia, Ohio, and Marvin Z. Woskow, McAllen, Tex., assignors, by mesne assignments, to Standard Oil Company, Chicago, Ill., a corporation of Indiana
No Drawing. Filed June 6, 1960, Ser. No. 33,920
5 Claims. (Cl. 208—143)

This invention relates to catalytic hydrogenation, and more particularly relates to a process for effecting the hydrogenation of organic feedstocks, particularly when such feedstocks contain sulfur.

The hydrogenation of organic compounds is a well established and frequently practiced process. Fats and vegetable oils, which are the glycerides of unsaturated fatty acids, are "hardened" by hydrogenation olefinically unsaturated compounds, particularly the olefinic hydrocarbons such as the codimer of n-butylene and i-butylene, are converted to paraffins or related saturated materials; aromatic feedstocks such as benzene are hydrogenated to cyclohexane; and a variety of other processes are practiced commercially. In all of these processes, a necessary feature is the provision of suitable catalysts which possess the desirable activity and selectivity, yet which maintain these characteristics over long periods of time. In addition, the hydrogenation catalyst must be resistant to contaminants in the feedstock, especially sulfur. A principal object of the present invention is to provide a process for effecting the hydrogenation of hydrogenatable feedstocks, particularly those which contain organic sulfur contaminants.

We have now discovered that the foregoing object is attained by effecting hydrogenation over a catalyst consisting essentially of platinum and a thiocyanate ion supported on alumina.

In one aspect, the catalyst composition comprises between about 0.05 and 1 percent by weight of platinum and between about 0.05 and 6 percent by weight of thiocyanate ion, supported on alumina. By the term "thiocyanate ion," we designate the content of the SCN anion, although it of course recognized that the ion per se probably has no separate identity on the catalyst composition, but rather is coupled in some way with either the platinum constituent, the alumina support, or both. The precise nature of such coupling is not presently known, nor is it important to the principles and practice of the present invention. Components other than platinum, thiocyanate, and alumina may be present on the catalyst composition in minor amounts, usually less than about 0.05%, provided they do not exhibit undesirable physical or chemical effects on the catalyst or on any process employing the same. In general, the platinum and thiocyanate on alumina catalysts are superior in stability, especially under adverse conditions which seriously impair the activity of prior-art catalysts.

The alumina base or support advantageously comprises either gamma alumina or eta alumina, or mixtures of these allotropic forms. These definitions of alumina are the definitions adopted as standard nomenclature by Russell in his brochure entitled "Alumina Properties," Technical Paper No. 10, 1953, Aluminum Company of America, and by Stumpf et al., Ind. Eng. Chem., 42, 1950, pages 1398–1403.

Platinum and thiocyanate on alumina catalysts may be prepared in a number of ways. In general, these methods entail the preparation of a solid composition consisting essentially of about 0.05–1 percent by weight platinum and about 0.05–1 percent by weight of a halogen, such as fluoride, iodide, bromide, or optimally chloride, on the appropriate alumina support. This composition is then treated with an aqueous solution of a thiocyanate in a quantity sufficient to replace at least a substantial amount of halogen from the solid composition and thereby incorporate between about 0.05 and 6 percent by weight of thiocyanate ion, after which the resultant composition may be recovered, and thereafter dried and calcined. The thiocyanate solution may contain an alkali metal thiocyanate such as sodium or potassium thiocyanate, although it is preferred that such cations which may be detrimental to the hydrogenation process be removed from the completed catalyst by methods known to the art. Alternatively, volatile cations such as the ammonium or substituted ammoniums (i.e. amines such as diethylamine or ethyldiamine) may be used.

The alumina base may be prepared by any of the methods known to the art for obtaining the desirable form of alumina. For example, gamma alumina is converted by calcining alpha alumina monohydrate, which in turn is obtained by drying alpha alumina trihydrate. The trihydrate, or other form of hydrous alumina ultimately yielding gamma alumina, may be obtained by such means as: reacting pure aluminum metal and water above 250° F.; reacting aluminum metal with water containing a minor amount of an acid such as dilute HCl; digesting aluminum metal amalgamated with mercury or a mercuric compound such as the oxide with water or with water containing a dilute organic acid such as acetic acid; or by reacting aluminum metal with an aqueous strong acid. In each case, the hydrous alumina may be modified by adjusting the pH to within the range of about 6.8–7.8 with a base, preferably a nitrogen base such as ammonia or ethanolamine.

Alumina which contains at least a substantial proportion, e.g. 5% or more ranging up to 95% or more, of the eta form may also be prepared by any of several well known means. Each of the following methods affords a hydrous alumina which, upon drying, transforms to beta alumina trihydrate, and upon further heating or calcination passes through the alpha alumina monohydrate stage and yields eta alumina. By way of example, an alumina hydrosol or other form of hydrous alumina which would ordinarily be converted to gamma alumina may be aged at a pH in excess of around 8 for from 1 to 48 or more hours, after which the resultant alumina may be dried and calcined to eta alumina. Other methods of preparing eta alumina, or an alumina containing a substantial proportion of the eta phase, include: reacting water on finely divided or amalgamated aluminum metal at a temperature below 104° F.; hydrolyzing an aluminum alkoxide at room temperature or below; alkalyzing an aqueous solution of an acid-acting water-soluble aluminum salt such as the nitrate or chloride; acidification or neutralization of a basic aluminum salt as sodium aluminate; and hydrolyzing a neutral aluminum salt such as aluminum acetate.

According to the preferred method of preparing the alumina support, whether gamma or eta, aluminum metal in the form of sheets, granules, turnings, shot, or other high surface area forms is subjected to amalgamation by contact with mercury or with an aqueous solution of a mercuric salt. The amalgamated aluminum is then digested in water in the presence of a low concentration (suitably about 0.5–7 percent by weight) of acetic acid or other weak organic carboxylic acid as a peptizing agent. The reaction goes forward readily at ordinarily or autogenous pressures and at temperatures above about 100° F., preferably about 125–210° F. Thick viscous hydrosols are obtained at temperatures above 160° F., while relatively thin hydrosols are obtained at temperatures below 160° F. The alumina concentration ordinarily varies from about 2 to about 8% $Al_2O_3$. The mixture of amalgamated aluminum and acidulated water is preferably agitated in order to improve the contact of the reacting materials and to assist in breaking the layer of froth which is ordinarily formed by hydrogen liberated in the reaction. A reflux condenser is advantageously employed to condense water and acid vapors from the emerging hydrogen stream and to return the resulting condensate to the reaction vessel. The reaction gradually slows down after about 24 hours and ultimately ceases for all practical purposes after about 40 hours. The resultant hydrosol product is a syrupy liquid of opalescent, nearly transparent appearance, and may be further clarified by settling, centrifugation, filtration, or the like to remove any suspended materials, including particles of metallic mercury. For gamma alumina, the hydrosol may be dried at 200–400° F. for 6–24 hours to afford alpha alumina trihydrate. Upon calcination at 800–1200° F. for 1–6 hours the alpha trihydrate forms gamma alumina.

The method described immediately above may also be employed to manufacture eta alumina. To obtain the eta modification, the hydrosol is agitated and commingled with an alkaline substance, preferably a nitrogen base such as ammonia, in a quantity sufficient to raise the pH above about 8.5, but insufficient to convert any considerable portion of the alumina into an aluminate salt. The pH is ordinarily maintained below about 12, and preferably is in the range of about 10–11. The alkalized hydrosol is aged for about 1 to 48 hours or more at about 50–250° F., preferably around 70–100° F., for about 6 to 24 hours, the shorter aging periods corresponding generally to the higher pH levels and (in lesser degree) to the higher temperatures. During this operation, white, finely divided hydrous alumina forms in the liquid phase as a filterable slurry. After completion of the desired alkali aging the slurry may be filtered to separate the hydrous alumina, suitably at about 150–200° F. in order to ensure rapid filtration rates. The filter cake is then dried at 150–400° F. to beta alumina trihydrate, i.e. to a water content less than about 50%, wet basis, preferably between 15 and 40%. It may be calcined at 800–1200° F. to a material which contains at least a substantial portion, i.e. 5% or more, of eta alumina.

The platinum constituent may be incorporated with the alumina at any of several stages in alumina manufacture, although the catalysts produced by the different modifications are not necessarily equivalent. For example, platinum in the form of a water-soluble compound such as chloroplatinic acid, chloroplatinous acid, the ammonium or alkali salts of such acids, complexes of platinum salts (e.g. chloride, nitrate, sulfate, oxychloride, nitrite, etc.) with ammonia or substituted ammonias such as alkylamines, quinoline, pyridine, hydrazo compounds, hydroxylamine, etc. may be used. The platinum compound may be cogelled with an alumina sol or gel, either before or after alkali aging, and if desired may be "set" by sulfiding with $H_2S$, $NH_4S$, or ammonium polysulfide in a less-than-stoichiometric amount. The platinum on alumina gel may then be dried, calcined, ground, mixed with a lubricant such as Sterotex (hydrogenated coconut oil) then pelleted and re-calcined.

Alternatively, platinum may be impregnated onto a solid alumina by cogelling an aqueous solution of a platinum compound with a solid-form alumina, which may be alumina hydrate. Here again, the platinum may be sulfided immediately after incorporation. Among the many steps of catalyst preparation during which platinum may be added, there may be mentioned: addition to the hydrous alumina which forms upon alkali aging of a hydrosol, impregnation onto dried alumina trihydrate, impregnation onto calcined gamma or eta alumina, or impregnation onto calcined and pelleted gamma or eta alumina, after which the material should be dried and calcined.

When a halogen-containing platinum compound such as chloroplatinic acid is employed in preparing the solid composition of platinum on alumina, the composition will ordinarily contain from about 0.05 to about 1 percent by weight of halogen, associated in some as-yet-undetermined manner with the alumina and/or platinum. Replacement of this halogen by thiocyanate ion is thus conveniently accomplished merely by washing the composition with an aqueous solution of thiocyanate such as sodium or ammonium thiocyanate to replace at least a substantial amount (e.g. 50% or more) of halogen with thiocyanate and obtain the desired about 0.05–6 percent thiocyanate ion on the composition. Such washing or impregnation may take place at any temperature ranging from about 30° F. to about 250° F., and with thiocyanate concentrations from about 0.005 molar to 10 molar or higher. A 5% sodium thiocyanate, or, better still, ammonium thiocyanate, is suitable for this purpose. It has been found that impregnation of pelleted platinum alumina composition is entirely satisfactory, and consequently commercial platinum on alumina hydroforming catalysts may be modified by replacement of halogen with thiocyanate to constitute the catalyst for our invention.

As an alternative to replacing halogen with thiocyanate by washing a dried and/or calcined platinum on alumina composition containing the halogen, thiocyanate may also be introduced by adding a water soluble thiocyanate, e.g. ammonium thiocyanate, to the alumina at any stage of its preparation, for example by cogelling or by impregnation as in the case of platinum.

Whatever method is employed for compositing the thiocyanate ion onto the platinum alumina, the resultant material is then advantageously washed with distilled water to remove soluble materials such as soluble halides or alkali metal cations. It is then dried, suitably at 150–400° F. for 6–24 hours, and thereafter calcined at 800–1200° F. for 1–6 hours. Calcination may take place in air, preferably in a moving current of air, and the resultant platinum and thiocyanate on alumina may be reduced with hydrogen gas at 4–900° F. before use, although such reduction is not essential.

The catalyst may be employed for the hydrogenation of a wide variety of hydrogenatable compounds, particularly where it is desired to have a highly selective process, that is, one wherein hydrogen is added to a hydrogenatable function, e.g. a double bond, an aromatic ring, a carboxyl group, a nitrile group, a nitro group, etc., without rupturing (hydrogenolysis) of a carbon-carbon or carbon-nitrogen bond. The present catalyst does however have the ability to destructively hydrogenate sulfur-containing compounds such as mercaptans and thiophenes to hydrogen sulfide and a paraffin. Consequently, desulfurization of sulfur-containing naphthas (about 200–400° F. boiling range) prior to reforming, or desulfurization of gas oils (400° F. plus boiling range) prior to catalytic cracking, may be accomplished readily. As examples of typical hydrogenation reactions which are catalyzed by the inventive catalyst, there may be mentioned: hydrogenation of glycerided unsaturated fatty acids; hydrogenation of olefinically unsaturated feedstocks such as the codimer of n-butylene and i-butylene; hydrogenation of aromatic hydrocarbon feedstocks such as benzene to cyclohexane or toluene to methyl cyclohexane; reduction of nitrile groups, such as the hydrogenation of adiponitrile in the presence of ammonia to form hexamethylene diamine; reduction of nitro compounds such as nitrobenzene or nitroxylene to aniline or xylidine respectively; reduction of carbonyl groups to alcohols, such as hexylene glycol to diacetone alcohol; and many other reactions. The catalyst is especially useful in processing hydrocarbons, such as in the hydrogenation of unsaturated and sulfur-containing naphthas obtained as products of catalytic cracking, thermal cracking, and the like, hydrofinishing of materials boiling higher than naphthas (naphthas ordinarily means hydrocarbons boiling chiefly within the range of about 200–400° F.) such as kerosene, gas oils, etc. An important application of platinum and thiocyanate on alumina catalysts is in the hydrodesulfurization of virgin and/or cracked naphthas preceding the hydroforming of such naphthas over a platinum alumina halogen catalyst, as for example by the hydroforming process described in U.S. Patent 2,773,014.

When employed for hydrogenating any of the foregoing feedstocks, the required processing conditions depend upon the specific reactions and the feedstocks involved and may readily be determined from the teachings of the prior art. In processing a petroleum naphtha, which may contain olefinically unsaturated hydrocarbons as well as from 0.005 to 2% organic sulfur, hydrogenation conditions suitably include a temperature between about 300–700° F., e.g. 600° F., a pressure between about 10 and 2000 pounds per square inch gauge, a weight hourly space velocity between about 0.1 and 20, e.g. 2.0, and a hydrogen:feedstock ratio of between 10:1 and 1:1, on a molar basis.

By way of illustration, but not by way of limitation, the following specific embodiments showing the preparation, composition and use of the catalysts are furnished.

EXAMPLE I

In this example a platinum and thiocyanate on gamma alumina is prepared, analyzed, and used in the hydrogenation of a sulfur-containing aromatic compound.

An alumina hydrosol is prepared by reacting amalgamated aluminum with 2% aqueous acetic acid at 160–170° F. for 24 hours, at the end of which time the reaction subsides and the reaction product is allowed to settle for 12 hours and the hydrosol decanted from the reaction vessel.

A portion of the hydrosol, containing 5.51 percent by weight of $Al_2O_3$ is stirred with an aqueous chloroplatinic acid solution containing 5 grams of platinum per liter, in an amount sufficient to introduce about 0.6 weight percent platinum on the final alumina. Concurrently, ammonium polysulfide in an amount less than stoichiometric is added. The pH is adjusted to approximately 6–6.5 with ammonia, after which the resultant cogelled sol is dried at 255° F. The dried alumina is ground to 30 mesh, mixed with 2 Sterotex, pelleted, and calcined for 4 hours at 1100° F.

The resultant platinum alumina halogen composition contains 0.582 weight percent platinum, 0.58% chlorine, 0.14% sulfur, and traces of copper, iron, and magnesium. Substantially all of the alumina is in the gamma phase.

A portion of the pelleted and calcined platinum alumina halogen composition is slurried with a large excess of 10% sodium thiocyanate solution (aqueous) for 24 hours, after which excess liquid is decanted off and the treatment repeated two additional times.

The treated catalyst is washed with distilled water several times to remove sodium ions, dried at room temperature, and then calcined at 752° F. for 3 hours in a stream of air.

Treatment with the thiocyanate solution is found to have reduced the chloride content to 0.12 weight percent, and increased the sulfur content to 1.27%. When a portion of the same platinum alumina halogen composition is treated with distilled water alone for the same period, the chlorine content is only reduced to 0.46%, while the sulfur content remains unchanged.

The thiocyanate-containing catalyst is compared with the original platinum alumina halogen composition for hydrogenation activity by hydrogenating a technical grade of the aromatic hydrocarbon phenanthrene, containing 0.53% sulfur, in a batch system. Five grams of catalyst and 50 grams of phenanthrene are placed in stirred autoclave maintained at 600° F. and 1500 p.s.i.g., with hydrogen introduction being on pressure control. After 18 hours the products are withdrawn and analyzed to determine the extent of saturation produced by the respective catalysts. The following results are observed:

Hydrogenation of Phenanthrene

[Conditions: Pressure—1500 p.s.i.; Charge Stock—Tech Grade Phenanthrene (0.53% S)]

| Run | Product Analysis | | | | |
|---|---|---|---|---|---|
| | $C_{14}H_{10}$ | $C_{14}H_{12}$ | $C_{14}H_{14}$ | $C_{14}H_{16}$ | $C_{14}H_{18}$ |
| (Charge Stock) | 84 | 3 | 1 | 11 | 1 |
| Platinum-Alumina-Halogen | 33 | 30 | 12 | 4 | 21 |
| Platinum-Thiocyanate-Alumina | 26 | 31 | 16 | 3 | 24 |

It will be observed that the thiocyanate-containing catalyst converted in excess of 21% more of the phenanthrene than the platinum alumina halogen catalyst.

EXAMPLE II

In this example platinum is impregnated onto a dried and calcined gamma alumina, and, after re-calcination, is treated with thiocyanate.

A 5.51% $Al_2O_3$ hydrosol, prepared as in Example I, is treated with ammonia to a pH within the range of about 6–6.5 and then dried at 255° F. and calcined for 3 hours at 900° F. The resultant gamma alumina is ground to 30 mesh, mixed with 2% Sterotex, pelleted, and calcined for 4 hours at 1100° F. The pellets are mixed with a sufficient amount of aqueous chloroplatinic acid solution containing about 6 grams of platinum per liter, in an amount sufficient to provide about 0.3% platinum on the final catalyst. If desired, aluminum chloride in an equimolar amount with respect to chloroplatinic acid may be added at the same time. After impregnation, the platinum alumina halogen composition is dried at about 250° F. and calcined at 1100° F. for 4 hours.

The calcined composition is treated once with 10% aqueous sodium thiocyanate solution for 48 hours, after which excess solution is removed and the catalyst washed with distilled water, dried for 24 hours at 212° F., and calcined at 932° F. for 6 hours.

EXAMPLE III

In this example thiocyanate is incorporated onto a platinum on eta alumina composition.

A hydrosol containing 5.51 percent by weight of $Al_2O_3$, and prepared as in Example I, is adjusted to a pH of approximately 10 by addition of the required quantity of aqueous 29% ammonium hydroxide. The mixture is thereafter allowed to stand at room temperature for a total period of 48 hours. The resulting slurry is filtered. The filter cake is commingled with sufficient aqueous solution containing chloroplatinic acid in a quantity sufficient to incorporate 0.6 percent by weight of platinum with respect to the alumina; simultaneously, ammonium polysulfide is added in about one half the stoichiometric requirement to precipitate platinum. The mixture is dried at 255° F., and the dried material calcined for 3 hours at 900° F., ground, mixed with Sterotex (2%), pelleted, and re-calcined for 4 hours at 1100° F.

The resulting platinum alumina halogen composition is soaked twice in 10% ammonium thiocyanate in aqueous solution for 24 hours each, then filtered, washed with water, dried for 24 hours at 212° F., and calcined at 932° F. for 6 hours.

While the invention has been described with reference to certain specific embodiments thereof, it is to be understood that these are illustrative only and not by way of limitation. Numerous modifications and equivalents of our invention will be apparent from the foregoing description to those skilled in the art.

We claim:

1. A hydrogenation process which comprises contacting a hydrogenatable feedstock with hydrogen gas under suitable hydrogenation conditions with a catalyst consisting essentially of between about 0.05 and 1 percent by weight of platinum and between about 0.05 and 6 percent by weight thiocyanate ion, supported on alumina.

2. A process for hydrogenating a sulfur-containing feedstock which comprises contacting said feedstock with hydrogen gas under suitable hydrogenation conditions with a catalyst consisting essentially of between about 0.05 and 1 percent by weight of platinum and between about 0.05 and 6 percent by weight thiocyanate ion, supported on alumina.

3. A process for hydrogenating an olefinically unsaturated feedstock which comprises contacting said feedstock with hydrogen gas under suitable hydrogenation conditions with a catalyst consisting essentially of between about 0.05 and 1 percent by weight of platinum and between about 0.05 and 6 percent by weight thiocyanate ion, supported on alumina.

4. A process for hydrogenating an aromatic feedstock which comprises contacting said feedstock with hydrogen gas under suitable hydrogenation conditions with a catalyst consisting essentially of between about 0.05 and 1 percent by weight of platinum and between about 0.05 and 6 percent by weight thiocyanate ion, supported on alumina.

5. A process for hydrogenating a sulfur-contained naphtha which comprises contacting said naphtha with hydrogen gas under suitable hydrogenation conditions with a catalyst consisting essentially of between about 0.05 and 1 percent by weight of platinum and between about 0.05 and 6 percent by weight thiocyanate ion, supported on alumina.

References Cited in the file of this patent

UNITED STATES PATENTS

| | | |
|---|---|---|
| 2,662,861 | Riblett et al. | Dec. 15, 1953 |
| 2,964,480 | Schwartz | Dec. 13, 1960 |